United States Patent
Situ et al.

(10) Patent No.: US 12,122,305 B2
(45) Date of Patent: Oct. 22, 2024

(54) VEHICLE LOGO ASSEMBLY AND METHOD FOR FORMING VEHICLE LOGO ASSEMBLY

(71) Applicant: VALEO VISION, Bobigny (FR)

(72) Inventors: Jianpeng Situ, Bobigny (FR); Changqi Wu, Bobigny (FR); Xiaoling Zhang, Bobigny (FR); Peng Gao, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/790,537

(22) PCT Filed: Dec. 29, 2020

(86) PCT No.: PCT/CN2020/140700
§ 371 (c)(1),
(2) Date: Jul. 1, 2022

(87) PCT Pub. No.: WO2021/136241
PCT Pub. Date: Jul. 8, 2021

(65) Prior Publication Data
US 2023/0037082 A1    Feb. 2, 2023

(30) Foreign Application Priority Data
Jan. 3, 2020 (CN) .......................... 202010008947.2

(51) Int. Cl.
*B60R 13/00* (2006.01)
*C08J 7/12* (2006.01)
(Continued)

(52) U.S. Cl.
CPC ............... *B60R 13/005* (2013.01); *C08J 7/12* (2013.01); *C09K 5/14* (2013.01); *F21S 43/26* (2018.01);
(Continued)

(58) Field of Classification Search
CPC ..... C09K 5/14; C08J 7/12; F21S 43/26; F21S 43/27; F21S 45/47
See application file for complete search history.

(56) References Cited

U.S. PATENT DOCUMENTS 9,616,823 B1    4/2017 Salter et al.
10,081,295 B2   9/2018 Dellock et al.
(Continued)

FOREIGN PATENT DOCUMENTS

CN    201484317 U    5/2010
CN    106949419 A    7/2017
(Continued)

OTHER PUBLICATIONS

ISA/CN, International Search Report (with English translation) and Written Opinion of corresponding International Application No. PCT/CN2020/140700, dated Apr. 2, 2021.
(Continued)

*Primary Examiner* — Thomas M Sember
(74) *Attorney, Agent, or Firm* — Valeo Vision

(57) ABSTRACT

The present invention relates to a vehicle logo assembly and a method for forming a vehicle logo assembly. The vehicle logo assembly has a housing and a cover, the housing and the cover form an internal space, and a light-emitting assembly and a light-diffusing assembly are accommodated in the internal space, wherein, a coating is provided on the inner side of the cover facing the light-emitting assembly, so as to present a vehicle logo, and the cover is provided with a light-transmitting portion.

16 Claims, 4 Drawing Sheets

(51) Int. Cl.
  *C09K 5/14*    (2006.01)
  *F21S 43/20*   (2018.01)
  *F21S 43/27*   (2018.01)
  *F21S 45/47*   (2018.01)
  *F21W 104/00*  (2018.01)

(52) U.S. Cl.
  CPC ............... *F21S 43/27* (2018.01); *F21S 45/47* (2018.01); *F21W 2104/00* (2018.01)

(56) References Cited

U.S. PATENT DOCUMENTS

| | | | |
|---|---|---|---|
| 2010/0154261 A1* | 6/2010 | Bozlo | G09F 21/049 156/247 |
| 2014/0204344 A1 | 7/2014 | Harris | |

FOREIGN PATENT DOCUMENTS

| | | |
|---|---|---|
| CN | 107757515 A | 3/2018 |
| CN | 208585195 U | 3/2019 |
| CN | 208620288 U | 3/2019 |
| CN | 110285386 A | 9/2019 |
| CN | 209581355 U | 11/2019 |
| CN | 209650187 U | 11/2019 |
| CN | 209833546 U | 12/2019 |
| DE | 202016000724 U1 | 5/2016 |

OTHER PUBLICATIONS

China National Intellectual Property Administration, Search Report of corresponding Chinese Application No. 202010008947.2, dated May 31, 2024.
China National Intellectual Property Administration, Office Action (with English translation) of corresponding Chinese Application No. 202010008947.2, dated May 31, 2024.

* cited by examiner

VEHICLE LOGO ASSEMBLY AND METHOD FOR FORMING VEHICLE LOGO ASSEMBLY

CROSS-REFERENCE TO RELATED APPLICATIONS

This application is filed under 35 U.S.C. § 371 U.S. National Phase of International Application No. PCT/CN2020/140700 filed Dec. 29, 2020 (published as WO2021136241), which claims priority benefit to Chinese application No. 202010008947.2 filed on Jan. 3, 2020, the disclosures of which are herein incorporated by reference in their entirety.

TECHNICAL FIELD

The present invention relates to a vehicle logo assembly and a method for forming a vehicle logo assembly.

BACKGROUND OF THE INVENTION

Vehicle logos are mainly used for sellers, users, maintenance personnel, traffic management authorities, etc. to identify vehicles. In particular, with illuminated vehicle logos, visibility, aesthetics and safety can be further enhanced.

BRIEF SUMMARY OF THE INVENTION

The purpose of the present invention is to provide a vehicle logo assembly that can be produced cost-effectively.

The purpose of the present invention is also to provide a method for forming a vehicle logo assembly.

A vehicle logo assembly is provided according to the present invention, which has a housing and a cover, the housing and the cover form an internal space, and a light-emitting assembly and a light-diffusing assembly are accommodated in the internal space, wherein, a coating is provided on the inner side of the cover facing the light-emitting assembly, so as to present a vehicle logo, and the cover is provided with a light-transmitting portion. Light can leave the cover through the light-transmitting portion.

With this solution, since the cover itself has a certain thickness, when a coating is provided on the inner side of the cover, the coating forming the vehicle logo can be advantageously protected, thereby having excellent scratch resistance.

The coating comprises, for example, a first sub-coating and a second sub-coating. Of course, the coating may also have more sub-coatings, for example, a light-transmitting protective layer covering the first sub-coating and the second sub-coating. Here, the corresponding sub-coatings may be understood as coatings applied in different work steps. As an example, the first sub-coating is a screen-printed coating and the second sub-coating is a galvanized coating. A sub-coating or different sub-coatings may have different colors.

According to the embodiments of the present invention, the second sub-coating covers the first sub-coating. This can further help to prevent the first sub-coating from peeling. Here, it is to be understood that the second sub-coating can completely or partially cover the first sub-coating. Preferably, the second sub-coating completely covers the first sub-coating. Of course, the second sub-coating can additionally occupy, at least partially, an area on the inner side of the cover that is not covered by the first sub-coating.

According to the embodiments of the present invention, the second sub-coating is a light-transmitting layer to form a light-transmitting portion.

According to the embodiments of the present invention, both the first sub-coating and the second sub-coating are opaque layers, wherein a hollow portion of a preset width is provided at the boundary between the first sub-coating and the second sub-coating, to form the light-transmitting portion.

According to the embodiments of the present invention, the light-diffusing assembly comprises a first light-diffusing member and a second light-diffusing member, the first light-diffusing member is arranged on the light-emitting assembly, and the second light-diffusing member is arranged between the first light-diffusing member and the cover. The light-diffusing members may be transparent or translucent. When necessary, the surface of the light-diffusing members may be coated, roughened, or micro-faceted to facilitate light diffusion.

According to the embodiments of the present invention, the cross section of the first light-diffusing member has a semicircular inner contour and an outer contour formed by at least one arc-shaped section, for example, an outer contour in the shape of a half "8", so as to diffuse light from a light source of the light-emitting assembly.

According to the embodiments of the present invention, the first light-diffusing member is annular, and light sources of the light-emitting assembly are arranged annularly.

According to the embodiments of the present invention, the second light-diffusing member is plate shaped with through holes.

According to the embodiments of the present invention, a positioning structure and a locking structure are arranged on the outer circumference of the first light-diffusing member, and a matching positioning structure and a matching locking structure are arranged in the housing, which interact with each other to fix the light-emitting assembly between the first light-diffusing member and the housing; similarly, a positioning structure and a locking structure are provided on the outer circumference of the second light-diffusing member, and a matching positioning structure and a matching locking structure are provided in the housing, which interact with each other to fix the second light-diffusing member.

According to the embodiments of the present invention, the light-emitting assembly is a printed circuit board assembly.

According to the embodiments of the present invention, the light-emitting assembly is provided with a heat-dissipating component located between the light-emitting assembly and the housing, wherein a heat dissipation layer is provided on at least one of the two sides of the heat-dissipating component that are in contact with the light-emitting assembly and the housing.

The proposed method for forming a vehicle logo assembly comprises:
  providing a film, printing a coating on the film after pretreatment, forming the film after the coating is cured, placing the formed film in a mold and applying an injection molding material, to form an outer layer of the cover; and
  connecting the cover and the housing assembled with a light-emitting assembly and a light-diffusing assembly;
  wherein the injection molding material is applied on a side opposite to the side where the coating is on.

With this method, the first sub-coating is formed in particular by a printing method, for example, screen printing, which makes simple production possible. In addition, the first sub-coating can be made in a plurality of colors. Since the coating is on the inner side, excellent scratch resistance is also achieved.

According to the embodiments of the present invention, the coating may comprise a first sub-coating and a second sub-coating, wherein the second sub-coating is applied after the first sub-coating is applied.

The second sub-coating may cover the first sub-coating, and the second sub-coating is a light-transmitting layer.

According to the embodiments of the present invention, the method further comprises etching on the inner side of the cover so that a hollow portion is formed between the first sub-coating and the second sub-coating for light transmission.

According to the embodiments of the present invention, the film and the injection molding material are made of the same material. In this way, good binding is achieved between the film and the injection molding material, thereby forming a homogeneous cover body

BRIEF DESCRIPTION OF THE DRAWINGS

The present invention is further described below in conjunction with the drawings. In the drawings.

DETAILED DESCRIPTION OF THE INVENTION

Embodiments of the present invention will be described demonstratively below. As those skilled in the art should realize, the embodiments described may be amended in various ways without departing from the concept of the present invention. Accordingly, the drawings and the description are exemplary and not restrictive in nature. In the following text, identical drawing reference labels generally indicate functionally identical or similar elements.

A vehicle logo assembly has a housing and a cover. The vehicle logo assembly is mounted through the housing at a predetermined position on a vehicle, for example, the grille at the front of the vehicle, the trunk lid at the rear, one side or other suitable positions. A vehicle logo is provided on the cover, which presents the vehicle brand, manufacturer or other information and can be easily seen.

Figure 1:
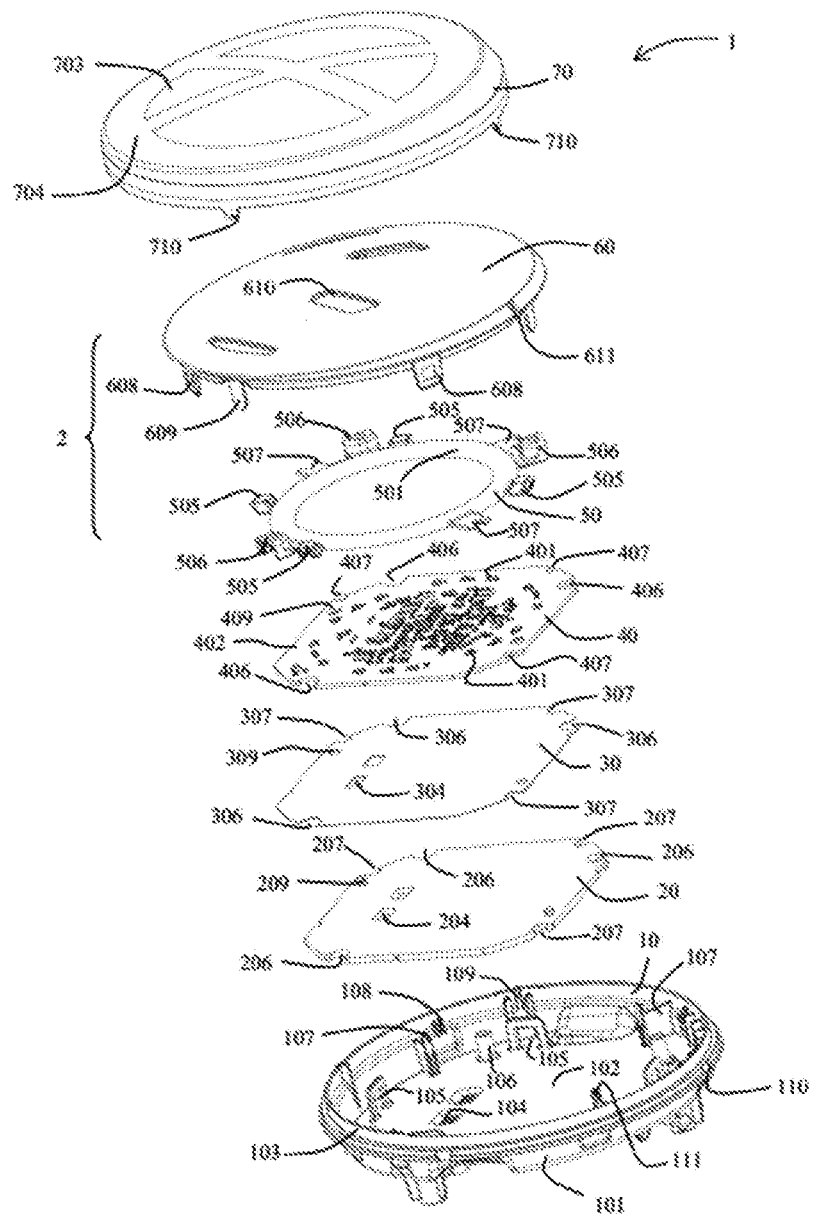
FIG. 1 is an exploded view of the vehicle logo assembly according to one embodiment.
Figure 2:
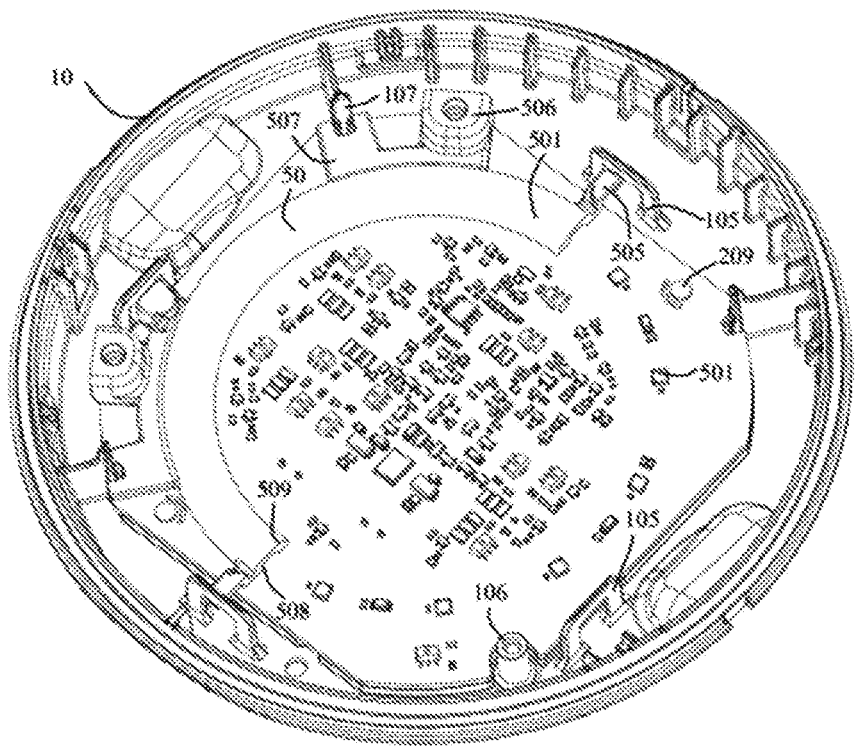
FIG. 2 is an illustration of a partially assembled vehicle logo assembly of FIG. 1.

FIG. 1 shows one embodiment of the vehicle logo assembly 1. In addition to the housing 10 and the cover 70, the vehicle logo assembly 1 also has a light-emitting assembly 40 and a light-diffusing assembly 2, and when necessary, a heat-dissipating component 20 and a heat dissipation layer 30, which are accommodated in the internal space defined by the housing 10 and the cover 70.

Figure 4:
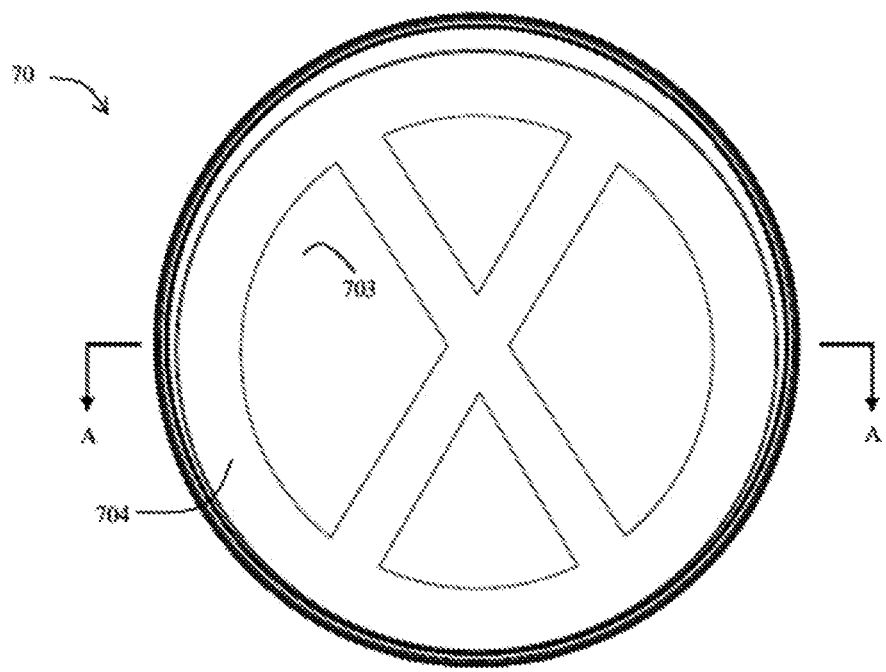
FIG. 4 is a front view of the cover of the vehicle logo assembly in FIG. 1.

As can be seen from FIG. 1 and FIG. 4, a vehicle logo is provided on the cover 70. In this example, the vehicle logo is a combined graphic formed by four fan-shaped areas, which are centrally located at the end face of the cover, and other areas of the end face of the cover that are not occupied by the vehicle logo may be regarded as background. Of course, the vehicle logo may have any desired shape. Additionally, a boundary ring, not shown, encircling the vehicle logo may also be provided. The cover 70 itself is a rigid structure made of any suitable light-transmitting material, for example, a polymeric material. A first sub-coating 703 is provided on the inner side of the cover facing the housing, which partially occupies this inner side and forms the vehicle logo. A second sub-coating 704 is also provided on the inner side, which at least partially occupies the remaining part of the inner side that is not covered by the first sub-coating.

In one solution, the first sub-coating and the second sub-coating may be in different colors when the first sub-coating and the second sub-coating complement each other exactly on the inner side of the cover 70. In this case, at least one of the two sub-coatings can transmit light, thereby the light-transmitting coating forms a light-transmitting portion so that light can exit through the cover.

Figure 3:
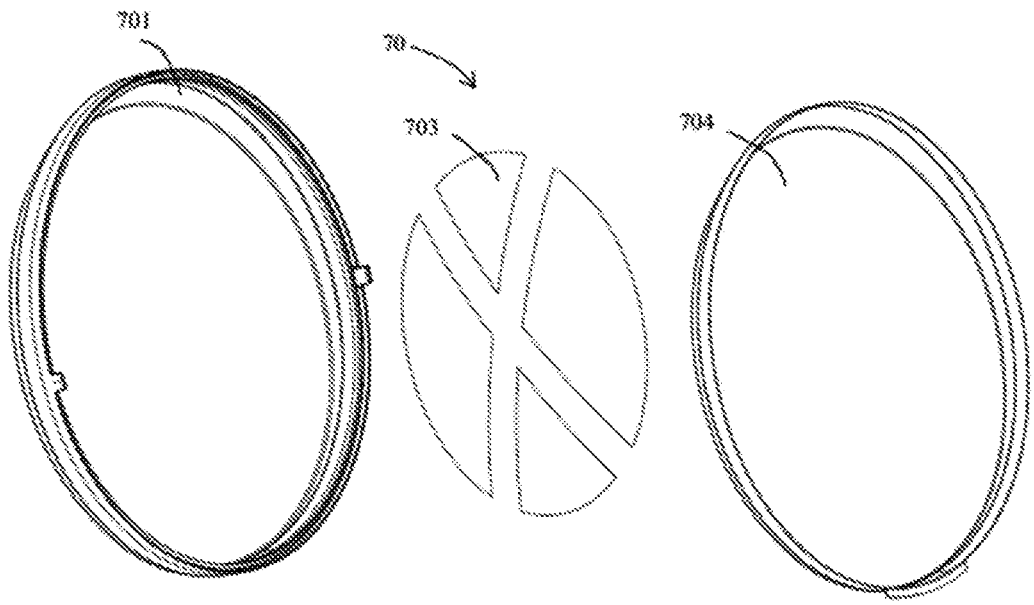
FIG. 3 is an exploded view of the cover of the vehicle logo assembly in FIG. 1.

In another solution, the second sub-coating can also at least partially cover the first sub-coating, or even completely cover the first sub-coating. In this case, the first sub-coating is an opaque layer, and the second sub-coating is a light-transmitting layer, so that the part of the inner side of the cover that is occupied by the second sub-coating but not occupied by the first sub-coating forms a light-transmitting portion that allows light to exit through the cover. In FIG. 3, the second sub-coating 704 is shown to completely cover the first sub-coating 703 as an exploded view for illustrative purposes. In other words, in this example, the first sub-coating lies between the cover body and the second sub-coating 704.

Figure 5:
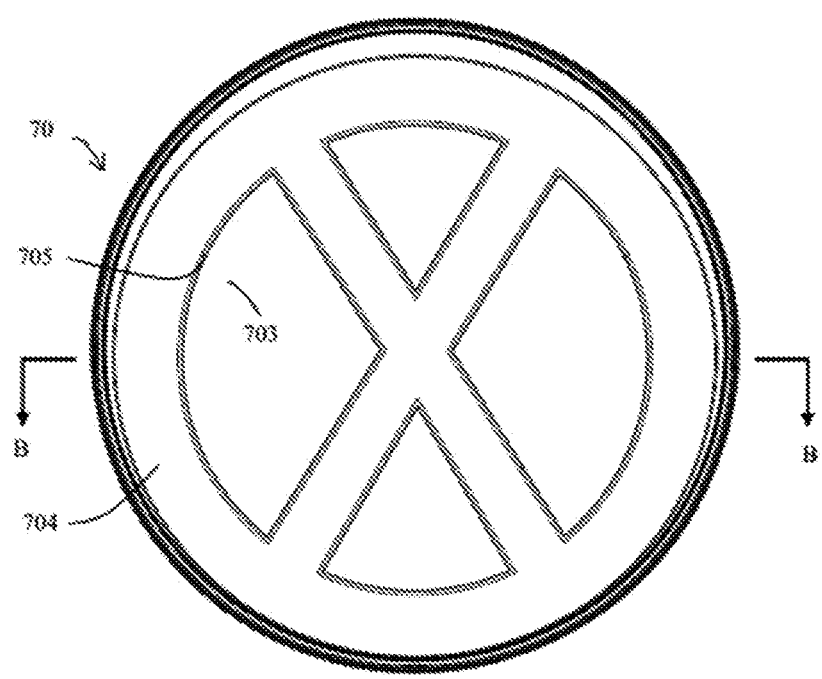
FIG. 5 is a front view of the cover of the vehicle logo assembly according to another embodiment.

In yet another solution, the second sub-coating is in an area on the inner side of the cover that is not covered by the first sub-coating. However, a hollow portion 705 is formed between the first sub-coating and the second sub-coating, as can be seen in FIG. 5. In this case, both the first sub-coating and the second sub-coating may be opaque layers, and light can exit from the hollow portion 705. Therefore, the hollow portion forms the light-transmitting portion.

Therefore, the light-transmitting portion may be the vehicle logo itself, the inner circumference of the vehicle logo, the outer circumference of the vehicle logo, the inner and outer circumferences of the vehicle logos, or other suitable parts.

Accordingly, the light-emitting assembly 40 is provided behind the cover 70. The light-emitting assembly has light sources of any form, for example, light emitting diodes, organic light emitting diodes, polymer light emitting diodes, or other forms of light emitting devices. The light sources can be powered by the vehicle power supply. An additionally provided controller, for example, the vehicle body controller, can be used to control the lighting of the light sources. A separate controller used for the vehicle logo assembly may also be provided. In order to control the luminous intensity of the light-emitting assembly, the controller can be used to control, for example, the magnitude of the current passing through the light sources.

In the example shown, the light sources are in the form of light-emitting diodes 401 arranged annularly on a PCB 402. The light sources may also have other layouts on the PCB as required. In addition, other electronic components are also mounted on the PCB.

In the case of using light-emitting diodes, the light source can be regarded as a point light source. For light to leave the cover uniformly, a light-diffusing assembly 2 is provided above the light-emitting assembly 40. In the example shown, the light-diffusing assembly 2 comprises a first light-diffusing member 50 and a second light-diffusing member 60, wherein the first light-diffusing member 50 is arranged on the light-emitting assembly 40 and is mainly used to enlarge the divergence angle of the light from the light sources, and the second light-diffusing member 60 is arranged between the first light-diffusing member 50 and the cover 70 and is mainly used to homogenize light. In this case, the corresponding light-diffusing members can be properly treated, to provide, for example, a coating, a roughened surface or other microstructures.

The basic shape of the first light-diffusing member 50 matches the geometry formed by the light sources. Here, the first light-diffusing member 50 has an annular substrate, which covers the light sources. The cross section of the substrate of the first light-diffusing member 50 has a semi-circular inner contour 508 and an outer contour 509 in the shape of a half "8", thereby diffusing light toward the inner and outer sides of the ring. This is also applicable to the first light-diffusing member 50 in other shapes.

The second light-diffusing member 60 is essentially plate shaped, and is made of a material capable of diffusing light. The second light-diffusing member 60 may be provided with through holes 610 to facilitate air circulation in the spaces on both sides thereof, thereby preventing condensation especially on the cover.

The light-diffusing assembly 40 is fixed on the housing. For this purpose, the housing 10 is integrally provided with fixing structures for the first light-diffusing member 50 and the second light-diffusing member 60.

A first positioning structure and a first locking structure 506 are provided on the outer circumference of the first light-diffusing member 50, and a first matching positioning structure and a first matching locking structure 106 are provided in the housing 10, which interact with each other to fix the light-emitting assembly 40 between the first light-diffusing member 50 and the housing 10. The first positioning structure may be in the form of an elastic tongue 505, a tab 507 with a slot, or a combination thereof on the outer circumference. The first matching positioning structure may be in the form of a mount 105, a guide wall 107 or a combination thereof formed on the housing. For joining, when the slot of the tab 507 is guided by the guide wall 107, the tongue 505 is inserted into the mount 105. At this point, the first locking structure 506 in the form of a cap with an opening occupies the correct position relative to the first matching locking structure 106 in the form of a protrusion with a threaded hole. After screws are fastened, the first light-diffusing member 50 is fixed, and thus the light-emitting assembly 40 is locked between the first light-diffusing member 50 and the housing.

A second positioning structure and a second locking structure 608 are provided on the outer circumference of the second light-diffusing member 60, and a second matching positioning structure and a second matching locking structure 108 are provided in the housing 10. The second positioning structure may be in the form of a tab 609, a notch 611 or a combination thereof on the outer circumference of the second light-diffusing member 60. The second matching positioning structure may be in the form of a pair of guide walls 109, a protrusion 111 or a combination thereof formed on the housing. For joining, the tab 609 is guided by the guide walls 109, and the protrusion 111 embedded in the notch 611 ensures that the second light-diffusing member occupies the correct position relative to the housing. At the same time, the second matching locking structure 108 in the form of a locking piece is engaged in the lock hole of the second locking structure 608, thereby fixing the second light-diffusing member 60 relative to the housing.

The above-mentioned matching positioning structures and matching locking structures on the housing may be provided at the bottom or the outer circumference of the housing.

Especially when the size of the PCB of the light-emitting assembly 40 exceeds that of the first light-diffusing member, the circumference of the PCB 402 is provided with slots 406 and 407, which match the positioning structure and locking structure of the first light-diffusing member. This additionally makes positioning of the PCB possible.

To facilitate heat dissipation, the light-emitting assembly 40 is provided with a heat-dissipating component 20, which is located between the light-emitting assembly 40 and the housing 40. The heat-dissipating component 20 is, for example, a plate of a preset thickness made of a metal (such as aluminum, copper, copper-aluminum alloy, etc.). Additionally, a heat dissipation layer 30 is provided on at least one of the two sides of the heat-dissipating component 20 that are in contact with the light-emitting assembly 40 and the housing respectively. The heat dissipation layer may be a heat sink made of a flexible material, or a thermal grease. This further facilitates heat dissipation. The illustrated example shows a heat dissipation layer 30 in the form of a heat sink, which is located between the light-emitting assembly and the heat-dissipating component. When the heat dissipation layer 30 is in the shape of a plate, it and the heat-dissipating component 20 may have the same outer contour as that of the PCB 402. For this, the heat dissipation layer 30 and the heat-dissipating component 20 may respectively have notches 306, 307, 206, and 207 corresponding to the positions of the slots 406 and 407 of the PCB. Of course, the heat-dissipating component 20 may have a larger size, and in this case, some of the notches can be round through holes.

The heat-dissipating component 20 may also have positioning pins 209 for the PCB 402. For this, corresponding positioning holes 409 and 309 are provided in the PCB and, if necessary, the heat dissipation layer 30.

When the light-emitting assembly 40 is electrically connected to, for example, a vehicle-mounted power supply through an electrical connector not shown, openings 304, 204 and 104 for electrical connectors to go through may be provided in the heat dissipation layer 30, the heat-dissipating component 20 and the housing 10 if necessary.

Preferably, the matching positioning structure and the matching locking structure of the housing 10 for the light-diffusing assembly and the light-emitting assembly are integrally formed on the housing, for example, by injection molding at the bottom 102 and the circumference 103 of the housing. This can simplify assembly.

The method for manufacturing the vehicle logo assembly 1 above will be described below.

Firstly, the cover 70 of the vehicle logo assembly 1 is manufactured. Here, in particular the in-mold film insert injection molding method is used. For this, a film 702 is firstly provided, the thickness of which is, for example, 0.1 mm, 0.125 mm, or 0.175 mm. When necessary, the film 702 is cut into a predetermined size and subject to pretreatment processes such as baking, dust removal, etc. The film 702 may be made of PET, PC, PMMA, etc. A first sub-coating 703 is then printed on the film 702, which may appear as a vehicle logo, for example, a graphic, text, or a combination thereof. Printing may be done by, for example, screen printing. Different colors may also be used in the first sub-coating, which is particularly suitable for vehicle logos with multiple colors. After the first sub-coating 703 is printed on the film 702, the film is placed in an oven for curing, for example, at a temperature of 80-100° C. for 1-2 hours.

The film is then hot-pressed and die-cut, preferably by 3D hot-pressing, so that the film matches the shape of the inner contour of the cover to be formed subsequently. Preferably, one or two layers of protective film may be applied to the film prior to hot-pressing and die-cutting, and the film may be punched for positioning if necessary. Of course, the protective film can be removed in subsequent steps.

The treated film is put into a mold and injection molded to form an outer layer 701 of the cover 70, wherein the outer layer 701 is located on the side of the film 702 opposite to the side to which the first sub-coating 703 is applied. Therefore, the outer layer is directly bound to the uncoated side of the film. Preferably, the injection molding material for forming the outer layer 701 is the same as the material for forming the film, for example, PET, PC, PMMA, etc., which makes possible the best binding of the outer layer and the film. When the outer layer 701 is thick, multi-shot injection molding may be used. Preferably, the outer layer 701 is transparent and abrasion resistant.

To apply the second sub-coating 704, various vacuum coating processes may be utilized, including but not limited to physical vapor deposition, and chemical vapor deposition. Optionally, galvanizing, chemical plating, chemical treatment, electrochemical treatment or other coating methods known in the art may also be used.

Figure 6:
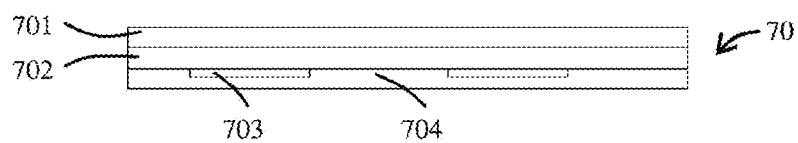
FIG. 6 is a diagram of cross-section A-A of the cover in FIG. 4.

As an example, the first sub-coating 703 is a paint coating, for example, a black paint coating, and the second sub-coating 704 is a metal coating, for example, an aluminum coating, a chrome coating, a silver coating, etc. The second sub-coating 704 completely covers the first sub-coating 703, and also occupies other areas not occupied by the first sub-coating. More precisely, the second sub-coating occupies the entire inner side of the housing 70, as can be seen from the cross-sectional view of FIG. 6. Of course, other suitable materials, for example, copper, etc., may also be used for the second sub-coating to obtain the desired appearance. The thickness of the second sub-coating can be controlled so as to form a transparent cover. The thickness can be set based on the required light transmittance. For example, the thickness of the second sub-coating is less than 20 nm, in particular less than 15 nm, and preferably between 5 and 15 nm. When the light sources are activated, light from the light sources can exit through the second sub-coating.

Figure 7:
FIG. 7 is a diagram of cross-section B-B of the cover in FIG. 5.

In another example, both the first sub-coating and the second sub-coating are opaque layers. After the two coatings are applied in the method described above, a hollow portion 705 can be formed at the boundary between the first sub-coating and the second sub-coating by etching, for example, laser etching, as can be seen in the cross-sectional view of FIG. 7. The hollow portion forms, for example, the circumference of the vehicle logo. When the light sources are activated, light from the light sources can exit from the hollow portion.

The colors of the first sub-coating and the second sub-coating can be selected as needed. Each sub-coating may have different colors. The thickness of the corresponding coating can be controlled so that light can penetrate it when passing through the coatings and leaving the lens.

Of course, the second sub-coating can only partially cover the areas on the inner side of the cover that are not occupied by the first sub-coating. In this way, the second sub-coating is not applied on the first sub-coating in an overlapping manner.

Additionally, a light-transmitting protective layer may also be applied on the second sub-coating.

After the light-emitting assembly, the light-diffusing assembly and, if necessary, the heat-dissipating component are mounted on the housing, the cover is connected to the pre-assembled housing. In order to prevent the internal electronics of the vehicle logo assembly from being affected by moisture from the external environment, the cover and the housing are connected in an airtight manner by, for example, welding, and gluing.

Therefore, the present disclosure provides an advantageous vehicle logo assembly. The logo is effectively protected from scratches as the logo-forming coatings are provided on the inner side of the cover. Especially by in-mold film insert injection molding, complex shapes can be made thanks to the excellent flexibility of the film. At the same time, the outer layer of the formed vehicle logo assembly has good surface abrasion resistance and chemical resistance.

The present invention, instead of being limited to the above-described structure, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

What is claimed is:

1. A vehicle logo assembly, comprising a housing and a cover, with the housing and the cover forming an internal space, and a light-emitting assembly and a light-diffusing assembly are accommodated in the internal space, and wherein a coating is provided on the inner side of the cover facing the light-emitting assembly, so as to present a vehicle logo, and the cover includes a light-transmitting portion, wherein the light-diffusing assembly includes a first light-diffusing member and a second light-diffusing member, the first light-diffusing member is arranged on the light-emitting assembly, and the second light-diffusing member is arranged between the first light-diffusing member and the cover, the second light-diffusing member is larger and extends past the first light-diffusing member.

2. The vehicle logo assembly according to claim 1, wherein the coating includes a first sub-coating and a second sub-coating.

3. The vehicle logo assembly according to claim 2, wherein the second sub-coating covers the first sub-coating, and the second sub-coating is a light-transmitting layer and forms the light-transmitting portion.

4. The vehicle logo assembly according to claim 2, wherein both the first sub-coating and the second sub-coating are opaque layers, with a hollow portion of a preset width is provided at a boundary between the first sub-coating and the second sub-coating, wherein the hollow portion forms the light-transmitting portion.

5. The vehicle logo assembly according to claim 1, wherein the cross section of the first light-diffusing member has a semicircular inner contour and an outer contour formed by at least one arc-shaped section, so as to diffuse light from a light source of the light-emitting assembly.

6. The vehicle logo assembly according to claim 5, wherein,
- a first positioning structure and a first locking structure are provided on the outer circumference of the first light-diffusing member, and a first matching positioning structure and a first matching locking structure are provided in the housing, which interact with each other to fix the light-emitting assembly between the first light-diffusing member and the housing; and
- a second positioning structure and a second locking structure are provided on the outer circumference of the second light-diffusing member, and a second matching positioning structure and a second matching locking structure are provided in the housing.

7. The vehicle logo assembly according to claim 1, wherein the first light-diffusing member is annular, and light sources of the light-emitting assembly are arranged annularly.

8. The vehicle logo assembly according to claim 1, wherein the second light-diffusing member is plate shaped with through holes.

9. The vehicle logo assembly according to claim 1, wherein the light-emitting assembly is a printed circuit board assembly.

10. The vehicle logo assembly according to claim 1, wherein the light-emitting assembly is provided with a heat-dissipating component located between the light-emitting assembly and the housing, with a heat dissipation layer is provided on at least one of the two sides of the heat-dissipating component that are in contact with the light-emitting assembly and the housing.

11. A method for forming a vehicle logo assembly, comprising:
- providing a film, printing a coating on the film after pretreatment, forming the film after the coating is cured, placing the formed film in a mold and applying an injection molding material, to form an outer layer of the cover; and
- connecting the cover and the housing assembled with a light-emitting assembly and a light-diffusing assembly;
- wherein the injection molding material is applied on a side opposite to the side where the coating is on.

12. The method according to claim 11, wherein the coating includes a first sub-coating and a second sub-coating, with the second sub-coating being applied after the first sub-coating.

13. The method according to claim 12, wherein the second sub-coating covers the first sub-coating, and the second sub-coating is a light-transmitting layer.

14. The method according to claim 12, further comprising etching on the inner side of the cover so that a hollow portion is formed between the first sub-coating and the second sub-coating for light transmission.

15. The method according to claim 11, wherein the film and the injection molding material are made of the same material.

16. A vehicle logo assembly, comprising a housing and a cover, with the housing and the cover forming an internal space, and a light-emitting assembly and a light-diffusing assembly are accommodated in the internal space, and wherein a coating is provided on the inner side of the cover facing the light-emitting assembly, so as to present a vehicle logo, and the cover includes a light-transmitting portion, wherein the coating includes an opaque first sub-coating and an opaque second sub-coating, with a hollow portion of a preset width is provided at a boundary between the first sub-coating and the second sub-coating, wherein the hollow portion forms the light-transmitting portion.

* * * * *